United States Patent [19]
Morlec et al.

[11] Patent Number: 5,494,587
[45] Date of Patent: Feb. 27, 1996

[54] PROCESS FOR THE CATALYTIC DEODORIZATION OF AND REDUCTION OF THE NITROGEN CONTENT IN LIQUID MANURE TANK EFFLUENTS

[75] Inventors: Jean Morlec, Saint Nazaire; Jean-François Lepage, Rueil Malmaison, both of France

[73] Assignee: Institut Francais du Petrole, Rueil Malmaison, France

[21] Appl. No.: 275,475

[22] Filed: Jul. 15, 1994

[51] Int. Cl.$^6$ .................................................. C02F 1/72
[52] U.S. Cl. ..................... 210/750; 210/763; 210/916; 422/5; 423/224; 423/230; 423/239.1; 423/244.01
[58] Field of Search ........................... 210/603, 718, 210/750, 752, 758, 763, 916; 422/5; 423/224, 226, 230, 239.1, 237, 244.01

[56] References Cited

U.S. PATENT DOCUMENTS

| | | | |
|---|---|---|---|
| 1,410,249 | 3/1922 | Henderson et al. | 422/5 |
| 3,029,201 | 4/1962 | Brown | 210/763 |
| 3,884,804 | 5/1975 | Robinson et al. | 210/764 |
| 3,966,450 | 6/1976 | O'Neil et al. | 210/759 |
| 4,018,568 | 4/1977 | Brewer | 210/763 |
| 4,307,067 | 12/1981 | Tagana et al. | 422/5 |
| 5,360,552 | 11/1994 | Yan | 210/916 |

*Primary Examiner*—Peter A. Hruskoci
*Attorney, Agent, or Firm*—Millen, White, Zelano, & Branigan

[57] ABSTRACT

A process for the catalytic deodorization of and reduction of the nitrogen content in liquid manure tank effluents comprises:

(a) in a basic medium catalytically oxidizing mercaptans into disulphides while simultaneously forming salts of hydrogen sulphide, (b) catalytically post combusting ammonia and amines to form nitrogen oxide, (c) catalytically reducing nitrogen oxides in the presence of a gaseous stream containing ammonia and amines.

21 Claims, 1 Drawing Sheet

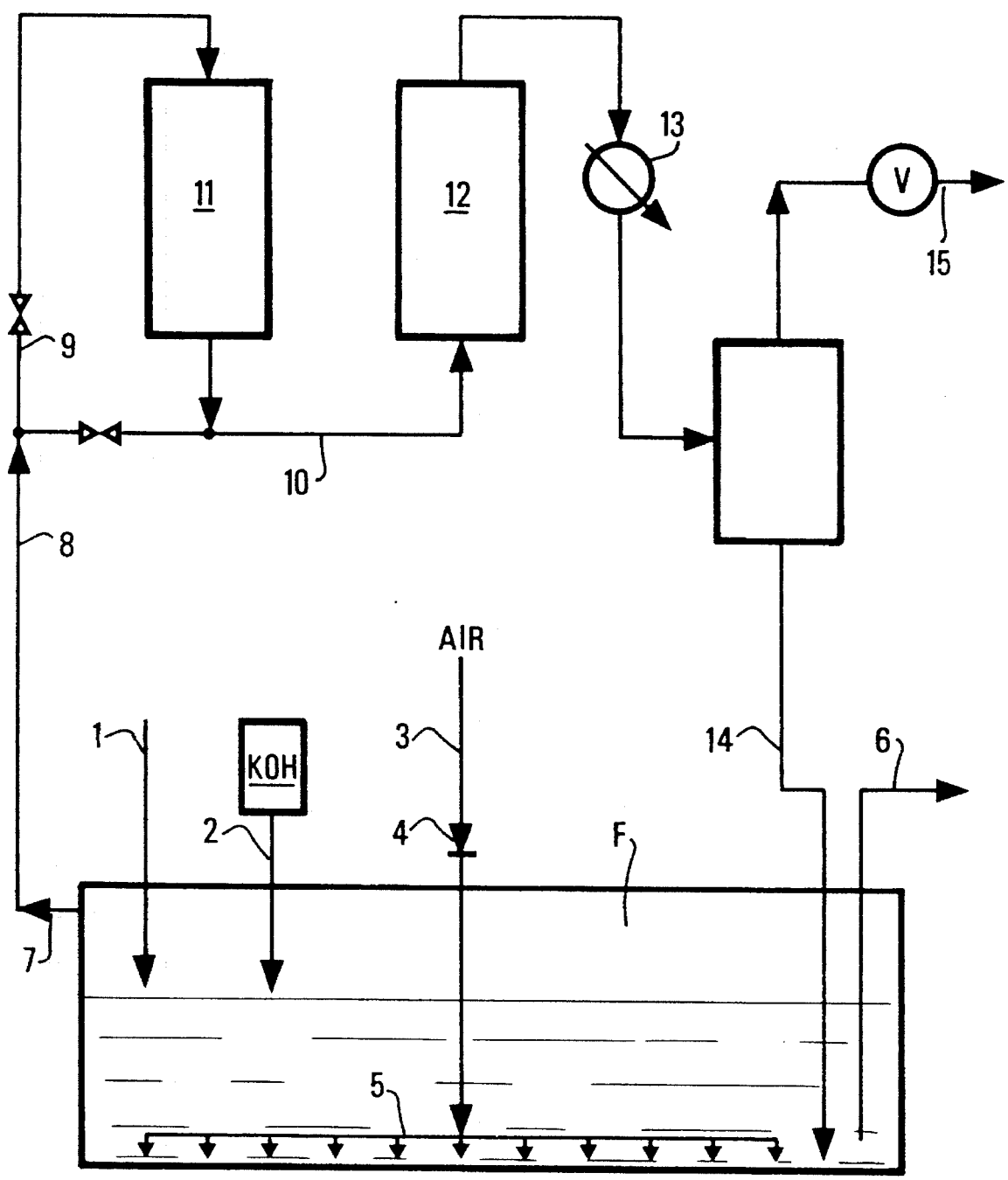

PROCESS FOR THE CATALYTIC DEODORIZATION OF AND REDUCTION OF THE NITROGEN CONTENT IN LIQUID MANURE TANK EFFLUENTS

BACKGROUND OF THE INVENTION

The present invention concerns a treatment process for organic fermentation products, in particular liquid pig manure, which contain objectionable sulphur- and nitrogen-containing substances. Problems are caused during spreading due to the presence of these substances which have a range of volatilities: the problems are connected with the odours and with the sudden deposition of nitrogen-containing substances, primarily ammonia, which contribute to surface water and water table pollution.

SUMMARY OF THE INVENTION

The invention concerns a process which chemically eliminates the most objectionable compounds from the storage pit itself, air-strips a fraction of the most volatile organic compounds and ammonia, burns the stripped products and transforms the ammonia and nitrogen oxides from the combustion step to molecular nitrogen. The invention thus concerns catalytic deodorization (DEOCAT$^R$).

Mercaptans are among the most objectionable compounds to be found in this medium, in particular light mercaptans: oxidizing their sodium or preferably potassium salts transforms them to disulphides which have a much higher recognition threshold, expressed as volume per million. Advantageously, they are also far less volatile. Oxygen is introduced by bubbling air slowly through the liquid the latter having been treated with a strong base, preferably caustic potash, which provides an additional fertilizing element. Oxidation can be catalysed by various active agents, which may be organic such as tannin compounds, or chelate type organometallic compounds such as transition metal phthalocyanines, or minerals such as sodalite containing a high proportion of sulphur radicals, known in the industry as cobalt blue. These catalysts can be used either in a water soluble form or as a suspended powder such as powdered cobalt blue. Activated carbon is preferred as a support for insoluble supported organic or organometallic compounds.

The aerating air used for the oxidation step entrains a greater or lesser quantity of volatile compounds, notably ammonia, from storage. In a second step, in accordance with the invention all or part of this air, laden with ammonia and volatile organic compounds (VOC), passes over a combustion catalyst where the VOCs are mostly transformed into carbon dioxide, the ammonia is transformed into nitrogen oxides and the sulphur in the sulphur-containing compounds is transformed into $SO_2$.

In a final step, the nitrogen oxides are reduced to molecular nitrogen by the action of ammonia either on an alumina, iron and vanadium based catalyst, or on a copper exchanged zeolite based catalyst, or on a supported platinum based catalyst. The ammonia for the reduction comes from a portion of the stripping air which by-passes the combustion reactor.

Elimination of mercaptans or their salts with strong bases by forming disulphides has been carried out for more than thirty years in certain light petroleum fraction sweetening processes. The assignee, Institute Francais du Pétrole, (IFP) has itself developed a number of catalysts and processes in this field which form the subject matter of French patents FR-B-2 591 610, FR-B-2 619 822, FR-B-2 635 111 and European patent document EP-B-213 026.

Catalytic combustion of VOCs contained in aerating air is a known reaction which is employed to eliminate pollutants from industrial combustion gases, automobile exhaust gases and oxidation process effluents. It is only necessary to select the best catalyst for treating the effluents from the particular case which constitutes the subject matter of the present invention.

Reduction of nitrogen oxides using ammonia is effected by reacting the compounds from the catalytic combustion step with a reducing gas containing ammonia obtained by rerouting the stoichiometric quantity required from the stripped gas and by-passing the catalytic combustion reactor. A number of catalysts have been described in the literature and are now in the public domain. These are precious metal catalysts, for example Pt, or oxide based catalysts, for example iron and vanadium oxides.

The invention concerns a three step process for treating liquid pig manure to render it both less objectionable and less of a pollutant during spreading. This sequence of steps eliminates or blocks most of the mercaptans, strips and burns a portion of the volatile organic compounds and a portion of the free ammonia to $CO_2$ and $NO_x$ respectively then reduces the nitrogen oxides to molecular nitrogen. The energy released from the combustion reactions can be used to produce hot water on site.

BRIEF DESCRIPTION OF THE DRAWING

The attached Figure is a schematic flowsheet of the various steps of the process. Liquid manure is introduced via line 1 into pit F to which a solution of potassium hydroxide or carbonate is added via line 2. Air is supplied via line 3 and check valve 4. The air bubbles into the liquid phase through distributor 5. The treated manure is evacuated via line 6. After aerating, the air, laden with ammonia gas and volatile organic compounds, is evacuated through vent 7 via line 8 to manifold (or pipe) 9. Half of the gas is transported to reactor 11 where the ammonia is transformed into nitrogen oxides and the VOCs (volatile organic compounds) are transformed into $CO_2$. The other half of the effluent (10) by-passes the first reactor and is mixed with the hot combustion gases before passing into second catalytic reactor (12) where the ammonia and VOCs reduce the nitrogen oxides to molecular nitrogen and the VOCs are transformed into $CO_2$. The gases are cooled (13) then condensed. The aqueous condensates containing sulphur oxides, namely $SO_3$, are recycled to the pit via (14) where they are neutralised by the caustic potash and ammonia. The gases from the condensation stage are released to the atmosphere at (15). The air is circulated by ventilator V either at the beginning of the circuit or at the outlet (15).

Oxidation of mercaptans to disulphides is carried out in basic medium at normal temperatures. The basicity is preferably accomplished by addition of 1/1000 to 1/100 mole/l of caustic potash or potassium carbonate. The catalysts employed may be metallic phthalocyanine complexes, preferably those of iron, which may either be rendered soluble by sulphonation, or may be insoluble and deposited on activated carbon which produces a cocatalytic effect on the transformation of the mercaptans into disulphides.

Examples of other catalysts which can activate selective oxidation of mercaptans are tannin derivatives in the presence of iron salts, [1-(2-thiazolylazo)]-2-naphthol and phenolic analogues thereof which can be variously substituted. Some sodalite mineral derivatives also exhibit good catalytic activity provided they are treated at high temperature in the presence of sodium sulphide (cobalt blue).

The combustion catalyst may have a very low precious metal content which may or may not contain copper, iron or rare earth promoters. More common cobalt, manganese or vanadium based catalysts may also be used but at temperatures above 100° C. to 150° C., ie, above 400° C. instead of 250°–300° C. for the precious metals. The reactor must therefore be preheated to initiate the reaction. Once the reaction has begun, the exothermicity of the ammonia and VOC combustion means that preheating can be terminated. The space velocity is between 10,000 and 100,000 $h^{-1}$, preferably between 20,000 and 50,000 $h^{-1}$, ie, between 20,000 and 50,000 liters of the total amount of gas per liter of catalyst per hour.

The catalyst for reducing the nitrogen oxides to molecular nitrogen may also be a platinum or palladium base deposited on a refractory support, or preferably a vanadium oxide based catalyst stabilized by oxides of group VIII metals, which are less sensitive to sulphur.

When the amount of oxygen introduced via 9 is carefully stoichiometrically controlled, the two operations of combustion and subsequent reduction of the nitrogen oxides can be carried out in the same reactor by superimposing the two catalyst types. However, by-passing the first reactor constitutes an automatic method of regulating the operation and results in greater operational flexibility.

The reduction operation is carried out at temperatures of between 350° C. and 550° C., preferably between 400° C. and 450° C., at total space velocities of between 5,000 and 50,000 $h^{-1}$ (1 of total gas/l cat/hour), preferably between 15,000 and 30,000 $h^{-1}$.

The solid catalysts are arranged in the reactors in such a fashion as to minimise the pressure drop and reduce the power requirement of the air circulating equipment. The beds can be radial (reactor 11) or axial (reactor 12); with an axial reactor, the catalyst can advantageously be arranged in stainless steel envelopes (tetrahedra, cylinders) packed into the reactor. The reactor operates in ascending flow mode to reduce the possibility of clogging and in particular to facilitate any cleaning which may become necessary simply by washing with water.

EXAMPLE 1

The sequence of operations shown in FIG. 1 was carried out on 1 $m^3$ of liquid manure in a tank, taken from four month old stock. The air flow rate was 1 $m^3$/hour. 0.5 kg of solid caustic potash and 10 g of iron phthalocyanine was added to the medium to be treated. The air flow was maintained for 1 hour. 60% of the effluent (620 l/h) was extracted from the outlet and transported to reactor 11 and 40% (410 l/h) was extracted and by-passed. The catalyst was a palladium based catalyst (0.3%) deposited on a stabilised tetragonal gamma type alumina with a surface area of 65 $m^2$/g and a porosity of 0.65 $cm^3$/g. The catalyst was in the form of 0.3 cm diameter spheres. The reactor was packed with an axial bed of 0.05 l of catalyst operating at 330° C.

The second reactor was also packed with an axial bed of vanadium based catalyst (ex vanadyl sulphate) and 3% of iron oxide (ex-ferric nitrate) deposited on a tetragonal alumina base support with a specific surface area of 54 $m^2$/g and pore volume of 0.7 $cm^3$/g. The reaction temperature was 430° C.

Column 1 of Table 1 shows an analysis of the liquid phase at the beginning of the operation. It can be seen that, after an hour of aeration, the mercaptans and mercaptide ions had been almost completely eliminated and transformed into disulphides and the ammonia, methane and a small amount of volatile organic compounds had been stripped out in the gaseous phase, while the organic acids and phenols had partially reacted with the caustic potash (column II). At the outlet to the first step, a large reduction in the odour of the product was observed, which is linked to the elimination of the mercaptans and the ammonia which are the most volatile compounds and have among the highest recognition thresholds (vpm).

The heavier organic compounds do not show up in the liquid phase analysis; the majority of them, such as methyl indoles, are highly insoluble in water and only slightly entrained from storage during aeration.

The gaseous flux was divided into two portions at the outlet to the first step: 54% of the flux passed into the combustion reactor, 46% was added directly to the catalytic nitrogen oxide reduction bed. The overall results are shown in Table 2 (column I). In a second run, 60% of the reducing flux by-passed the oxidation reactor. Increasing the reducing flux reduced the amount of nitrogen oxide liberated but at the expense of the reduced products liberated (column III).

The figures shown in Table 2 are averaged values obtained over the entire operating period, ie, 1 h.

EXAMPLE 2

The same operating conditions were used as in Example 1, with a manure sample taken from the same stock. The only differences from the test of Example 1 were:

the catalyst was a mechanical mixture of activated carbon impregnated with insoluble iron and cobalt phthalocyanines and cobalt blue powder. The carbon and the cobalt blue (sodalite+sodium sulphide) had a particle size of between 10 and 100 μm. The surface area of the carbon was 530 $m^2$/g. The weight of carbon was 200 g and that of the sodalite, 150 g.

All other conditions remaining identical, the two other combustion and nitrogen oxide reduction steps were carried out using the same catalysts, under the conditions described for the first test run of Example 1 (reduction flux/total flux=0.46). After cooling, however, the gaseous effluents were bubbled through a N/2 caustic potash solution for injection into the product to be treated in a subsequent operation, the amount of caustic potash added to the mixture to be treated was 2.8 kg/$m^3$, the gases from the reduction reactor were bubbled into an extractor containing 100 liters of water and 2.8 kg/$m^3$ of fresh caustic potash for the 2 hours the test.

The results of the second series of tests are shown in Table 1, column III and in Table 2, column IV. As in the previous example, it can be seen that the salt forming sulphur compounds disappeared and many of the impurities completely disappeared at the unit outlet: the caustic potash solution retained a large proportion of the liberated substances and formed salts: potassium sulphates, sulphites, nitrates, nitrites and mainly bicarbonate. The major portion of the caustic potash, however, remained unchanged.

EXAMPLE 3

280 kg of poultry droppings were slaked in water to produce 1 $m^3$ of a mixture which was treated under the conditions described for Example 2, except that the $NO_x$ reduction flow rate/total flow rate ratio was adjusted to minimise the amount of impurities in the discharged air. In this test, this optimum value was 0.43 and for this value, the mixture lost most of its odour of ammonia and the discharged substances contained only traces of ammonia and nitrogen oxides which had been transformed into molecular nitrogen or retained by the caustic potash solution which was used for the final wash.

TABLE 1

FIRST STEP: SETTLED LIQUID PHASE IMPURITIES

| Content kg/m³ | Untreated manure I | Treated manure (Ex. 1) II | Treated manure (Ex. 2) III |
|---|---|---|---|
| Methane | 1 | 0.1 | 0.13 |
| Ammonia | 1.7 | 0.17 | 0.18 |
| Dimethylamine | 2.3 | 0.44 | 0.5 |
| Trimethylamine | 3 | 0.33 | 0.39 |
| Indoles | 2.5 | 2.5 | 2.5 |
| Hydrogen sulphide | 0.5 | 0.05 | 0.05 |
| Mercaptans | 0.7 | 0 | 0 |
| Sulphides | 0.6 | 0.47 | 0.5 |
| Disulphides | 0.3 | 0.75 | 0.83 |
| Acetic acid | 0.5 | 0.5 | 0.5 |
| Butyric acid | 0.5 | 0.48 | 0.5 |
| Phenols | 0.8 | 0.8 | 0.8 |

TABLE 2

STEPS II & III: VOC AND NITROGEN ELIMINATION

| Content | Oxidation reactor (9) infeed | $NO_x$ reduction reactor (12) outlet | | |
|---|---|---|---|---|
| g/m³ of treated air | I | II | III | IV |
| Methane | 900 | 45 | 80 | 40 |
| Ammonia | 1530 | 2.5 | 6.5 | <2 |
| Σ amines | 4500 | 9 | 25 | <1 |
| Hydrogen sulphide | 630 | <1 | <1 | <1 |
| Σ sulphides | 350 | * | * | — |
| $NO_x$ | | 390 | 190 | <10 |
| $SO_x$ | | 175 | 180 | <10 |

*not measurable

The invention thus concerns a process for the elimination of hydrogen sulphide, mercaptans and volatile organic nitrogen compounds in a process having a number of steps:

transformation of the mercaptans into disulphides and the hydrogen sulphide into sulphides, in the presence of air and catalysts specific to this oxidation, catalytic post combustion of the volatile organic compounds, namely ammonia and certain light amines, entrained in the oxidizing air, in a proportion of between 30% and 70%, preferably between 50% and 65%, of the flux, catalytic reduction of the nitrogen oxides by ammonia and the reducing amines from the remainder of the gaseous stream which is not submitted to combustion.

The operating conditions for step I are preferably as follows:

T:normal

P:normal

Air flow rate: 0.5 to 5 m³/m³.h of liquid, preferably 1 to 2 m³/m³.h,

Catalysts: - soluble phthalocyanines (sulphonated with transition metals Co and Fe)

insoluble phthalocyanines deposited on activated C (200 to 1200 m²/g)

phthalocyanine concentration; 10 to 200 ppm with respect to liquid volume to be treated. On carbon: 5 to 100 ppm deposited on the carbon at a concentration of 3% to 5% by dry impregnation in cresol, cobalt blue, 5 to 100 g per m³ of product to be treated; preferably 10 to 50 g.

The operating conditions in step 2 are preferably as follows:

the catalyst preferably comprises:

a) Pt or Pd on refractory silica zirconia, silica alumina, stabilised alumina, sepiolite, atlapulgite, zeolite Y or mordenite type natural earths in a concentration of 2 g of metal per liter of catalyst. The catalyst can advantageously contain group IB metal promoters from the periodic classification (Au, Ag, Cu) and rare earth and iron oxides, or b) Fe, Co, Mn, V or W transition metal oxides, alone or as a mixture, T:preferably 250° C. to 550° C., P:atmospheric VVH:between 10 000 and 100 000 m³ of gaseous flux per m³ per hour, preferably between 20 000 and 50 000 h⁻¹.

The operating conditions in step 3 (reduction of nitrogen oxides) are preferably as follows:

Catalysts:(Pt and Rh), or preferably vanadium oxide stabilised with titanium, iron and cobalt oxides, T:between 250° C. and 550° C., preferably between 400° C. and 450° C., P:normal VVH:5,000 to 50,000 h⁻¹, preferably between 15,000 and 30,000 h⁻¹.

The combustion and reduction catalyst beds are preferably radial to reduce pressure drops.

When axial catalyst beds are used, they are operated in ascending current mode but the catalyst is packed in 5 to 10 cm³ volumes to reduce pressure drops, in particular the increase thereof with time. With this arrangement, the catalytic beds can be periodically rinsed.

The gases from the reduction step for the nitrogen oxides are preferably bubbled into the caustic potash solution which feeds the first reactor to limit the production of nitrogen oxides and sulphur.

In a preferred embodiment, the caustic potash from the first step is replaced by caustic soda or lithium hydroxide.

The final aerating solution may be caustic soda based or a suspension of milk of lime.

The process of the invention is applicable to liquid pig manure but can also be used for other objectionable ammonia-laden effluents provided that they are initially suspended in water: poultry droppings and other animal excrement, various waste waters, etc.

The deodorization and volatile nitrogen compound elimination operations can be carried out in continuous mode or, preferably, batchwise.

We claim:

1. A process for the elimination of hydrogen sulphide, mercaptans, ammonia and volatile amines from an organic liquid, said process comprising:

(a) passing air into said organic liquid, and catalytically oxidizing the mercaptans to disulphides, and simultaneously reacting said hydrogen sulphide with a basic medium introduced into said organic liquid so as to form a salt of hydrogen sulphide, and withdrawing from said organic liquid a gaseous stream containing residual oxidizing air, ammonia and volatile amines;

(b) dividing said withdrawn gaseous stream containing air, ammonia and volatile amines into two streams;

(c) subjecting a first divided gaseous stream, amounting to between 30 and 70% of said withdrawn gaseous stream, to catalytic combustion so as to convert the ammonia and the amines to nitrogen oxide;

(d) mixing the resultant nitrogen oxide stream with the second divided stream containing air, ammonia and amines, and catalytically reducing said nitrogen oxides in the resultant mixture so as to form nitrogen.

2. A process according to claim 1, wherein operating conditions in step (a) are as follows:

an air flow rate of: 0.5 to 5 $m^3/m^3.h$ of liquid, and the catalyst is selected from the group consisting of:
 sulphonated soluble phthalocyanines of transition metals Co and Fe,
 insoluble phthalocyanines deposited on activated carbon having a specific surface of, 200 to 1200 $m^2/g$, and
 cobalt blue in a concentration of 5 to 100 g per $m^3$ of product to be treated.

3. A process according to claim 2, wherein the air flow rate is 1 to 2 $m^3/m^3.h$.

4. A process according to claim 2, wherein said catalyst is cobalt blue in a concentration of 10 to 50 g per $m^3$.

5. A process according to claim 2, wherein operating conditions in step (c) are as follows:

the catalyst is:
 a) Pt or Pd on refractory silica-zirconia, silica-alumina, tetragonal alumina, sepiolite, attapulgite, zeolite Y or mordenite type natural earths in a concentration of 2 g of metal per liter of catalyst,
 b) Fe, Co, Mn, V or W metal oxides, alone or as a mixture, and a space velocity
  (VVH) : between 10,000 and 100,000 $m^3$ of said first divided gaseous stream per m3 of reactor volume per hour.

6. A process according to claim 5, wherein the operating conditions in step (d) are as follows:

catalysts : Pt+Rh, or vanadium oxide stabilized with titanium, iron and cobalt oxides, T:between 250° C. and 550° C., P:atmospheric VVH:5,000 to 50,000 $h^{-1}$.

7. A process according to claim 1, wherein operating conditions in step (c) are as follows:

the catalyst is:
 a) Pt or Pd on refractory silica-zirconia, silica-alumina, tetragonal alumina, sepiolite, attapulgite, zeolite Y or mordenite type natural earths in a concentration of 2 g of metal per liter of catalyst,
 b) Fe, Co, Mn, V or W metal oxides, alone or as a mixture, and a space velocity
  (VVH) between 10,000 and 100,000 $m^3$ of said first divided gaseous stream per m3 of reactor volume per hour.

8. A process according to claim 7, wherein catalyst is a platinum or palladium catalyst, said catalyst further containing a promoter selected from the group consisting of rare earth and iron oxides, and gold, silver and copper.

9. A process according to claim 7, wherein the catalyst is an Fe, Co, Mn, V or W metal oxide and wherein the process is conducted at a temperature of 250°–/550° C., and at a space velocity (VVH) of between 20,000 and 50,000 $h^{-1}$.

10. A process according to claim 1, wherein the operating conditions in step (d) are as follows:

catalysts: Pt+Rh, or vanadium oxide stabilised with titanium, iron and cobalt oxides, T:between 250° C. and 550° C., P:normal VVH:5,000 to 50,000 $h^{-1}$.

11. A process according to claim 10, wherein the catalyst is vanadium oxide stabilized with titanium, iron and cobalt oxides.

12. A process according to claim 10 conducted at 400°–450° C.

13. A process according to claim 10, wherein the space velocity is between 15,000 and 30,000 $h^{-1}$.

14. A process according to claim 1, wherein the catalysts in step (c) and (d) are in the form of radial beds to reduce pressure drop.

15. A process according to claim 1, comprising axial catalyst beds provided in an ascending current mode, the catalyst being packed in 5 to 10 $cm^3$ volumes to forestall an increased pressure drop with respect to time.

16. A process according to claim 1, wherein the gases withdrawn from step (d) are bubbled into the basic medium introduced into the organic liquid in step (a).

17. A process according to claim 16, wherein the basic medium comprises caustic potash, caustic soda or lithium hydroxide.

18. A process according to claim 1, wherein the treated organic liquid comprises liquid pig manure.

19. A process according to claim 1, wherein the treated organic liquid comprises an ammonia-laden effluent initially suspended in water.

20. A process according to claim 1, wherein the operations of (a), (c) and (d) are conducted batchwise.

21. A process according to claim 1, wherein said first divided gaseous stream amounts to between 50–65% of said withdrawn gaseous stream.

* * * * *